(12) United States Patent
Kuperman et al.

(10) Patent No.: US 8,080,492 B2
(45) Date of Patent: *Dec. 20, 2011

(54) HYDROCONVERSION MULTI-METALLIC CATALYST AND METHOD FOR MAKING THEREOF

(75) Inventors: Alexander E. Kuperman, Orinda, CA (US); Theodorus Maesen, Richmond, CA (US); Dennis Dykstra, Pinole, CA (US); Soy Uckung, Richmond, CA (US); Darren Fong, Oakland, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 150 days.

This patent is subject to a terminal disclaimer.

(21) Appl. No.: 12/432,730

(22) Filed: Apr. 29, 2009

(65) Prior Publication Data

US 2010/0279851 A1   Nov. 4, 2010

(51) Int. Cl.
*B01J 27/04* (2006.01)
*B01J 27/045* (2006.01)
*B01J 27/047* (2006.01)
*B01J 27/051* (2006.01)
*B01J 27/049* (2006.01)
*B01J 31/00* (2006.01)

(52) U.S. Cl. ........ 502/161; 502/216; 502/219; 502/220; 502/221; 502/170; 502/152; 502/208; 502/209; 502/211; 502/213; 502/223

(58) Field of Classification Search .................. 502/152, 502/161, 170, 168, 208, 209, 210, 211, 213, 502/16, 219, 220, 221, 223, 216

See application file for complete search history.

(56) References Cited

U.S. PATENT DOCUMENTS

| | | | |
|---|---|---|---|
| 3,640,817 A * | 2/1972 | O'Hara | 208/59 |
| 3,673,079 A | 6/1972 | Mulaskey et al. | |
| 3,709,814 A | 1/1973 | Jaffe | |
| 3,795,632 A | 3/1974 | Morgan et al. | |
| 4,003,851 A | 1/1977 | Ebel et al. | |
| 4,009,096 A | 2/1977 | Pollitzer et al. | |
| 4,226,742 A | 10/1980 | Bearden et al. | |
| 4,328,127 A * | 5/1982 | Angevine et al. | 502/219 |
| 4,422,960 A * | 12/1983 | Shiroto et al. | 502/206 |
| 4,430,442 A | 2/1984 | Sawyer et al. | |
| 4,499,203 A * | 2/1985 | Toulhoat et al. | 502/247 |
| 4,508,847 A | 4/1985 | Chianelli et al. | |
| 4,540,481 A | 9/1985 | Sawyer et al. | |
| 4,542,121 A | 9/1985 | Mitchell et al. | |
| 4,579,728 A | 4/1986 | Schoenthal et al. | |
| 4,595,672 A | 6/1986 | Ho et al. | |
| 4,637,870 A | 1/1987 | Bearden et al. | |
| 4,666,878 A | 5/1987 | Jacobson et al. | |
| 4,719,002 A | 1/1988 | Mayer et al. | |
| 4,721,558 A | 1/1988 | Jacobson et al. | |
| 4,740,295 A | 4/1988 | Bearden et al. | |
| 4,746,419 A * | 5/1988 | Peck et al. | 208/213 |
| 4,765,882 A | 8/1988 | Aldridge et al. | |
| 4,820,677 A | 4/1989 | Jacobson et al. | |
| 4,826,797 A | 5/1989 | Chianelli et al. | |
| 4,831,002 A | 5/1989 | Ho et al. | |
| 4,836,912 A | 6/1989 | Schlosberg et al. | |
| 4,976,848 A | 12/1990 | Johnson | |
| 5,026,473 A | 6/1991 | Halbert et al. | |
| 5,037,532 A | 8/1991 | Winter et al. | |
| 5,039,392 A | 8/1991 | Bearden et al. | |
| 5,053,376 A | 10/1991 | Bearden et al. | |
| 5,122,258 A | 6/1992 | Eadie et al. | |
| 5,162,281 A | 11/1992 | Kamo et al. | |
| 5,252,199 A | 10/1993 | Singhal et al. | |
| 5,278,121 A | 1/1994 | Singhal et al. | |
| 5,300,212 A | 4/1994 | Winter et al. | |
| 5,384,336 A | 1/1995 | Koros | |
| 5,397,456 A | 3/1995 | Dai et al. | |
| 5,648,577 A | 7/1997 | Ho et al. | |
| 5,695,632 A | 12/1997 | Brons et al. | |
| 5,728,644 A | 3/1998 | Ho et al. | |
| 5,767,037 A | 6/1998 | Ho et al. | |
| 5,831,138 A | 11/1998 | Ho et al. | |
| 5,900,384 A | 5/1999 | Soltani-Ahmadi et al. | |
| 5,935,418 A | 8/1999 | Chakrabarty et al. | |
| 5,935,421 A | 8/1999 | Brons et al. | |
| 5,935,897 A | 8/1999 | Trubenbach et al. | |
| 5,977,192 A | 11/1999 | Howsmon et al. | |
| 6,030,915 A * | 2/2000 | de Boer | 502/39 |

(Continued)

FOREIGN PATENT DOCUMENTS

| | | | |
|---|---|---|---|
| EP | 526988 | | 6/1992 |
| EP | 1169414 | | 10/2008 |
| EP | 2103347 | | 9/2009 |
| WO | WO 02/04117 | * | 1/2002 |
| WO | 2007070394 | | 6/2007 |

OTHER PUBLICATIONS

PCT Search Report and Written Opinion related to PCT/US2010/030331 dated Dec. 28, 2010.
Material Safety Data Sheet—Malic Acid. Date.
Co-pending U.S. Appl. No. 12/432,719, filed Apr. 29, 2009.
Co-pending U.S. Appl. No. 12/432,721, filed Apr. 29, 2009.
Co-pending U.S. Appl. No. 12/432,723, filed Apr. 29, 2009.
Co-pending U.S. Appl. No. 12/432,727, filed Apr. 29, 2009.
Co-pending U.S. Appl. No. 12/432,728, filed Apr. 29, 2009.
Co-pending U.S. Appl. No. 12/770,388, filed Apr. 29, 2010.

(Continued)

*Primary Examiner* — Elizabeth Wood

(57) ABSTRACT

A catalyst precursor for preparing a bulk multi-metallic catalyst upon sulfidation is provided. The precursor has an essentially monomodal pore volume distribution with at least 90% of the pores being macropores, and a total pore volume of at least 0.08 g/cc. The bulk multi-metallic prepared from the precursor is particularly suitable for hydrotreating heavy oil feeds having a boiling point in the range of 343° C. (650° F.)—to 454° C. (850° F.), an average molecular weight Mn ranging from 300 to 400, and an average molecular diameter ranging from 0.9 nm to 1.7 nm.

15 Claims, 1 Drawing Sheet

U.S. PATENT DOCUMENTS

| | | | |
|---|---|---|---|
| 6,136,180 | A | 10/2000 | Benazzi et al. |
| 6,156,695 | A | 12/2000 | Soled et al. |
| 6,162,350 | A | 12/2000 | Soled et al. |
| 6,171,471 | B1 | 1/2001 | Ferrughelli et al. |
| 6,174,429 | B1 * | 1/2001 | George-Marchal et al. ............... 208/111.01 |
| 6,299,760 | B1 | 10/2001 | Soled et al. |
| 6,461,995 | B1 | 10/2002 | Addiego et al. |
| 6,531,516 | B2 | 3/2003 | Davis et al. |
| 6,534,437 | B2 | 3/2003 | Eijsbouts et al. |
| 6,566,296 | B2 | 5/2003 | Plantenga et al. |
| 6,620,313 | B1 | 9/2003 | Demmin et al. |
| 6,635,599 | B1 | 10/2003 | Eijsbouts et al. |
| 6,652,738 | B2 | 11/2003 | Eijsbouts et al. |
| 6,712,955 | B1 | 3/2004 | Hou et al. |
| 6,758,963 | B1 | 7/2004 | Hantzer et al. |
| 6,783,663 | B1 | 8/2004 | Riley et al. |
| 6,919,066 | B2 | 7/2005 | Holzle |
| 7,119,045 | B2 * | 10/2006 | Magna et al. ............... 502/313 |
| 7,183,005 | B2 | 2/2007 | Poloso et al. |
| 7,229,548 | B2 | 6/2007 | Riley et al. |
| 7,232,515 | B1 | 6/2007 | Demmin et al. |
| 7,288,182 | B1 * | 10/2007 | Soled et al. ............... 208/112 |
| 7,387,983 | B2 | 6/2008 | Holzle |
| 7,507,770 | B2 | 3/2009 | Dogterom et al. |
| 2002/0010088 | A1 | 1/2002 | Eijsbouts et al. |
| 2002/0045539 | A1 * | 4/2002 | Kasztelan ............... 502/222 |
| 2003/0102254 | A1 | 6/2003 | Eijsbouts et al. |
| 2003/0150778 | A1 | 8/2003 | Haluska et al. |
| 2004/0182749 | A1 * | 9/2004 | Domokos et al. ............... 208/213 |
| 2004/0235653 | A1 | 11/2004 | Domokos et al. |
| 2005/0040080 | A1 | 2/2005 | Riley et al. |
| 2005/0250863 | A1 | 11/2005 | Green et al. |
| 2006/0060500 | A1 * | 3/2006 | Guillaume et al. ............... 208/108 |
| 2006/0060502 | A1 | 3/2006 | Soled et al. |
| 2006/0060503 | A1 | 3/2006 | Soled et al. |
| 2006/0070915 | A1 | 4/2006 | Euzen et al. |
| 2006/0157386 | A1 | 7/2006 | Al-Naeem et al. |
| 2006/0207917 | A1 | 9/2006 | Domokos et al. |
| 2007/0084754 | A1 | 4/2007 | Soled et al. |
| 2007/0090023 | A1 | 4/2007 | Soled et al. |
| 2007/0090024 | A1 | 4/2007 | Soled et al. |
| 2008/0060977 | A1 | 3/2008 | Bhan |
| 2008/0132407 | A1 | 6/2008 | Bai et al. |
| 2008/0275286 | A1 | 11/2008 | Xiao et al. |
| 2008/0306172 | A1 | 12/2008 | Reynhout et al. |
| 2008/0308462 | A1 | 12/2008 | Eijsbouts-Spickova et al. |
| 2009/0014356 | A1 | 1/2009 | Eijsbouts-Spickova et al. |
| 2009/0057201 | A1 | 3/2009 | Brait et al. |
| 2009/0107883 | A1 | 4/2009 | Maesen et al. |
| 2009/0107886 | A1 | 4/2009 | Maesen et al. |
| 2009/0107889 | A1 | 4/2009 | Maesen et al. |
| 2009/0111682 | A1 | 4/2009 | Maesen et al. |
| 2009/0111683 | A1 | 4/2009 | Zhan et al. |
| 2009/0111685 | A1 | 4/2009 | Maesen et al. |
| 2009/0111686 | A1 | 4/2009 | Kuperman et al. |
| 2009/0112010 | A1 | 4/2009 | Maesen et al. |
| 2009/0112011 | A1 | 4/2009 | Maesen et al. |

OTHER PUBLICATIONS

PCT Search Report and Written Opinion for PCT/US08/81463 mailed Jan. 14, 2009 (Atty. Ref. 12/259,412.

Adsorption-Desorption Isotherm Studies of Catalysts, Ries et al., The Sixclair Kefinlngc Company, Aug. 1945.

Hydrodesulfurizafion Activity MoS2 and Bimetallic Catalysts Prepared by in Situ Decomposition of Thiosalt, Trakarnpruk et at, *Ind. Eng. Chem. Res.* 2007, 46, 1874-1882.

MgO-supported Mo, CoMo and NiMo sulfide hydrotreating catalysts, Zdražil, Catalysis Today 86 (2003) 151-171.

Cobalt-molybdenum sulfide catalysts prepared by in situ activation of bimetallic (Co—Mo) alkylthiomolybdates, Nava et al., Catalysis Letters vol. 86, No. 4, Mar. 2003.

Structured zeolites catalysts with hierarchical channel structure, Gu et al., www.rsc.org/chemcomm. Feb. 2010.

Pore structure of bulk tungsten carbide power catalysts, Lofberg et al., Catalysis Letters 33 (1995) 165-173.

Preparation of Cr2O3-promoted copper catalysts on rice husk ash by incipient wetness impregnation, Chang et al., Applied Catalysis A: General 288 (2005) 53-61.

Determination of effectiveness factor of a partial internal wetting catalyst from adsorption measurement, zhou et al., Chemical Engineering Science 59 (2004) 4305-4311.

Chemisorption of Hydrogen Sulfide on Nickel and Ruthium Catalysts, Oliphant et 0.1., Journal of Catalysis 51, 229-242 (1978).

Lower Closure Point of Adsorption Hysteresis in Ordered Mesoporous Silicas, Morishige et al., *Langmuir* 2007, 23, 11021-11026.

Physisorption hysteresis loops and the characterization of nanoporous materials, Sing et al., Adsorption Science & Technology (2004), 22(10), 773-782.

Catalysis Today 41 (1998) pp. 207-219 "Surface Area and Pore Structure of Catalysts" by Leofanti et al.

Energy & Fuels 2009, 23, pp. 1683-1694 "Atmospheric Residues of Kuwait Heavy Crude Upgrading: A Pilot Plant and Model Simulation Study" by Bahzad et al.

Chemical Engineering Science 62 (2007) pp. 463-470 Drying of wet agglomerates in a continuous fluid bed: Influence of Residence time, air temperature and air flow rate on the drying kinetics and.

"Molecular Weight Distribution in Heavy Crudes" 1998 Paper authored by Boduszynski et al.

Energy & fuels pp. 1065-1071 "Estimation of Total Aromatic Content of Vacuum Gas Oil (VGO) Fractions (370-560 ° C.) by 1H NMR Spectroscopy" by Kapur et al, 2005.

\* cited by examiner

HYDROCONVERSION MULTI-METALLIC CATALYST AND METHOD FOR MAKING THEREOF

CROSS-REFERENCE TO RELATED APPLICATIONS

NONE.

TECHNICAL FIELD

The invention relates generally to a hydroprocessing catalyst precursor, processes for preparing the catalyst precursor, multi-metallic catalysts prepared using the catalyst precursor, and hydroconversion processes employing the multi-metallic catalysts.

BACKGROUND

The petroleum industry is increasingly turning to heavy crudes, resids, coals and tar sands, i.e., lower grade hydrocarbon ("heavy oil"), as sources for feedstocks. The upgrading or refining of these feedstocks is accomplished by treating the feedstocks with hydrogen in the presence of catalysts to effect conversion of at least a portion of the feeds to lower molecular weight hydrocarbons, or to effect the removal of unwanted components, or compounds, or their conversion to innocuous or less undesirable compounds.

In the hydroconversion process, it is desirable to employ catalyst having sufficient open volume (porosity) for low mass transfer resistance and facilitate efficient through flow of reactors, while at the same the specific area of each catalyst body should be as large as possible to increase exposure of the reactants to the catalyst material. However, a catalyst that is highly porous does not necessarily mean that the catalyst has a lot of surface area. The catalyst may be too porous, having very little in terms of surface area and correspondingly, low catalytic activity in terms of reactive sites.

There is a need for a bulk/unsupported catalyst for use in the hydroconversion of lower grade hydrocarbon with improved performance, i.e., providing high yield conversions with optimum porosity and surface area. There is also a need for a bulk multi-metallic catalyst having sufficient pore volume/size for hydrotreating heavy oil feeds.

SUMMARY OF THE INVENTION

In one aspect, a process for hydrotreating a hydrocarbon feed under hydroprocessing conditions is provided. The process comprises contacting the hydrocarbon feed with a bulk multi-metallic catalyst prepared by sulfiding a catalyst precursor comprising at least a Group VIB metal compound; at least a promoter metal compound selected from Group VIII, Group IIB, Group IIA, Group IVA and combinations thereof, optionally at least a ligating agent; optionally at least a diluent; the catalyst precursor after being shaped, having an essentially monomodal pore size distribution with at least 95% of the pores being macropores and a total pore volume of at least 0.08 g/cc.

In one aspect, a catalyst precursor, upon sulfidation, forms a bulk-multimetallic catalyst for hydrotreating a hydrocarbon feed under hydroprocessing conditions is provided. The catalyst precursor comprises at least a Group VIB metal compound; at least a promoter metal compound selected from Group VIII, Group IIB, Group IIA, Group IVA and combinations thereof, optionally at least a ligating agent; optionally at least a diluent. The catalyst precursor after being shaped, has an essentially monomodal pore size distribution with at least 95% of the pores being macropores and a total pore volume of at least 0.08 g/cc.

In yet another aspect, a process to prepare a bulk multi-metallic catalyst for hydrotreating a hydrocarbon feed is provided. The process comprising: providing at least a Group VIII metal precursor $M^{VIB}$ and at least promoter metal precursor $M^P$, the promoter metal precursor $M^P$ is selected from the group of Group VIII, Group IIB, Group IIA, Group IVA and c$^{ombi}$nations thereof, has an oxidation stat$^e$ of either +2 or +4; combining the at least a Group VIII and the at leas$^t$ $^a$ promoter metal precursor to form a cata yst precursor precipitate in a l$^i$quid solution; separating the catalyst precursor precipitate from the liquid so$^{luti}$on forming a filter cake; drying the $^c$atalyst precursor filter cake by a non-agglomerative drying method, obtaining catalyst precursor particles; adding to the catalyst precursor particles at least one of shaping aid agent, a pore forming agent, a peptizing agent, a diluent, and combinations thereof, forming a batch mixture; shaping the batch mixture forming a shaped catalyst precursor; sulfiding the shaped catalyst precursor forming the bulk multi-metallic catalyst.

In yet another aspect, a process to prepare a multi-metallic catalyst composition for hydrotreating a hydrocarbon feed is provided. The process comprising: providing at least a Group VIII metal precursor $M^{VIB}$ and at least promoter metal precursor $M^P$, the promoter metal precursor $M^P$ is selected from the group of Group VIII, Group IIB, Group IIA, Group IVA and combinations thereof, has an oxidation state of either +2 or +4; combining the at least a Group VIII and the at least a promoter metal precursor to form a catalyst precursor precipitate in a liquid solution; separating the catalyst precursor precipitate from the liquid solution forming a filter cake; treating the filter cake with at least a ligating agent forming a chelated catalyst precursor; drying and shaping the chelated catalyst precursor, forming a shaped catalyst precursor; and sulfiding the shaped catalyst precursor forming the bulk multi-metallic catalyst.

DETAILED DESCRIPTION

Figure 1:
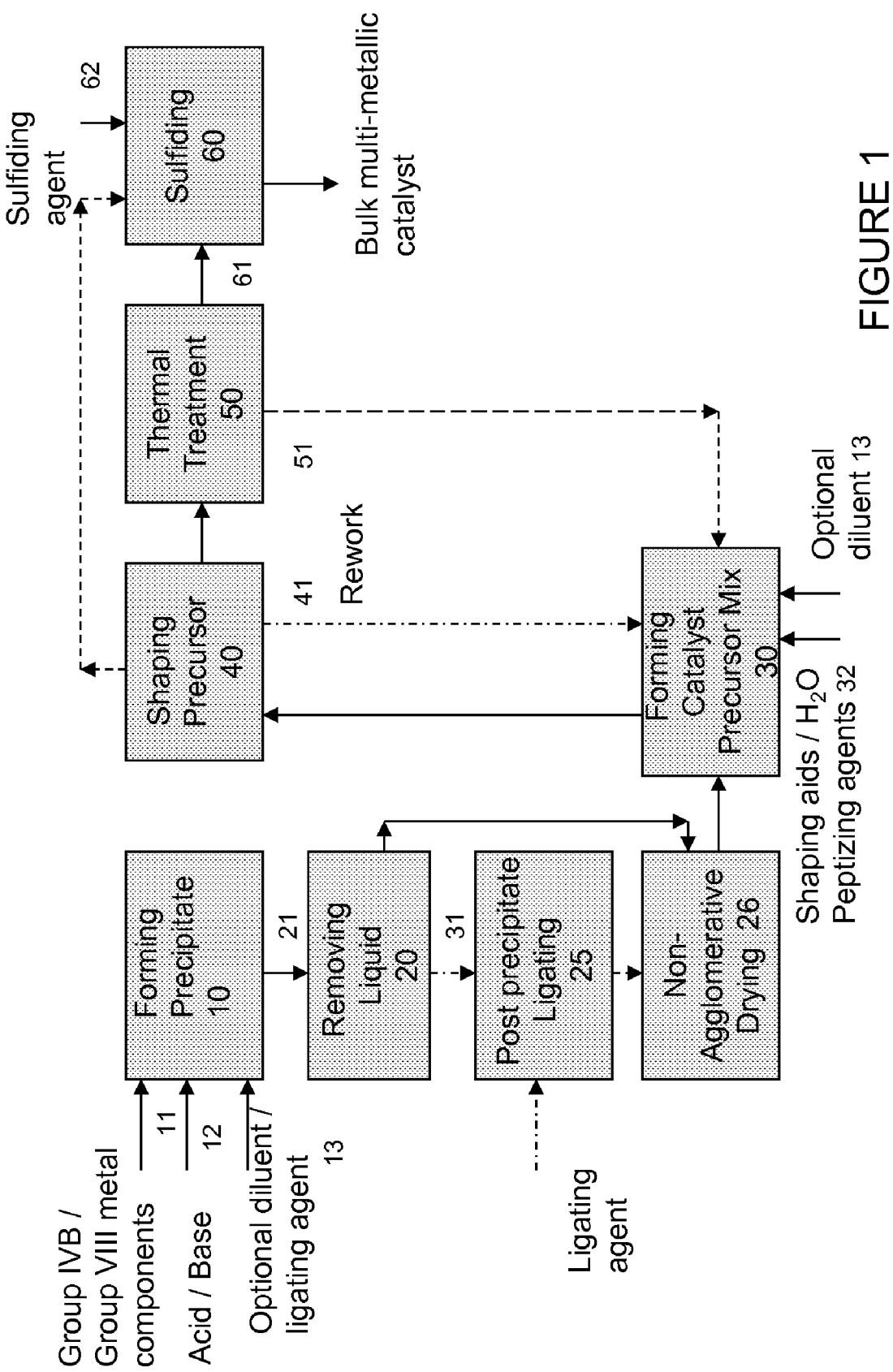
FIG. 1 is block diagram showing an embodiment of a process for making a multi-metallic catalyst incorporating rework materials.

The following terms will be used throughout the specification and will have the following meanings unless otherwise indicated.

SCF/BBL (or scf/bbl, or scfb or SCFB) refers to a unit of standard cubic foot of gas ($N_2$, $H_2$, etc.) per barrel of hydrocarbon feed.

LHSV means liquid hourly space velocity.

The Periodic Table referred to herein is the Table approved by IUPAC and the U.S. National Bureau of Standards, an example is the Periodic Table of the Elements by Los Alamos National Laboratory's Chemistry Division of October 2001.

As used here, the term "bulk catalyst" may be used interchangeably with "unsupported catalyst," meaning that the catalyst composition is NOT of the conventional catalyst form which has a preformed, shaped catalyst support which is then loaded with metals via impregnation or deposition catalyst. In one embodiment, the bulk catalyst is formed through precipitation. In another embodiment, the bulk catalyst has a binder incorporated into the catalyst composition. In yet another embodiment, the bulk catalyst is formed from metal compounds and without any binder.

As used herein, the phrases "one or more of" or "at least one of" when used to preface several elements or classes of elements such as X, Y and Z or $X_1$-$X_n$, $Y_1$-$Y_n$ and $Z_1$-$Z_n$, is intended to refer to a single element selected from X or Y or Z, a combination of elements selected from the same common class (such as $X_1$ and $X_2$), as well as a combination of elements selected from different classes (such as $X_1$, $Y_2$ and Zn).

As used herein, "hydroconversion" or "hydroprocessing" is meant any process that is carried out in the presence of hydrogen, including, but not limited to, methanation, water gas shift reactions, hydrogenation, hydrotreating, hydrodesulphurization, hydrodenitrogenation, hydrodemetallation, hydrodearomatization, hydroisomerization, hydrodewaxing and hydrocracking including selective hydrocracking. Depending on the type of hydroprocessing and the reaction conditions, the products of hydroprocessing can show improved viscosities, viscosity indices, saturates content, low temperature properties, volatilities and depolarization, etc.

As used herein, 700° F.+ conversion rate refers to the conversion of a feedstock having a boiling point of greater than 700° F.+ to less than 700° F. (371.0° C.) boiling point materials in a hydroconversion process, computed as (100%* (wt. % boiling above 700° F. materials in feed−wt. % boiling above 700° F. materials in products)/wt. % boiling above 700° F. materials in feed)).

As used herein, "LD50" is the amount of a material, given all at once, causes the death of 50% (one half) of a group of test animals. LD-50 measures the short-term poisoning potential (acute toxicity) of a material with the testing being done with smaller animals such as rats and mice (in mg/Kg).

As used herein, "shaped catalyst precursor" means catalyst precursor formed (or shaped) by spray drying, pelleting, pilling, granulating, beading, tablet pressing, bricketting, using compression method via extrusion or other means known in the art or by the agglomeration of wet mixtures. The shaped catalyst precursor can be in any form or shape, including but not limited to pellets, cylinders, straight or rifled (twisted) trilobes, multiholed cylinders, tablets, rings, cubes, honeycombs, stars, tri-lobes, quadra-lobes, pills, granules, etc.

As used herein, pores are classified according to size into three categories; micropores (dimension smaller than 3.5 nm), mesopores (dimension ranging from 3.5-500 nm) and macropores (dimension larger than 500 nm).

Pore porosity and pore size distribution in one embodiment are measured using mercury intrusion porosimetry, designed as ASTM standard method D 4284. In another embodiment, pore porosity and size distribution are measured via the nitrogen adsorption method. Unless indicated otherwise, pore porosity is measured via the mercury intrusion method.

Catalyst Product: The hydroconversion bulk catalyst having low volume shrinkage herein is formed from a catalyst precursor. The precursor is converted into a catalyst (becoming catalytically active) upon sulfidation, e.g., for subsequent use in hydrodesulfurization (HDS), hydrodearomatization (HDA), and hydrodenitrification (HDN) processes. The starting material, i.e., catalyst precursor, can be a hydroxide or oxide material, prepared from at least a Promoter metal and a Group VIB metal precursors. The metal precursors can be in either elemental or compound form.

In one embodiment, the catalyst is prepared from a catalyst precursor in the form of a bulk multi-metallic oxide comprising of at least one Group VIII non-noble material and at least two Group VIB metals. In one embodiment, the ratio of Group VIB metal to Group VIII non-noble metal ranges from about 10:1 to about 1:10. In another embodiment, the oxide catalyst precursor is of the general formula: $(X)_b(MO)_c(W)_dO_z$; wherein X is Ni or Co, the molar ratio of b:(c+d) is 0.5/1 to 3/1, the molar ratio of c:d is >0.01/1, and z=[2b+6(c+d)]/2. In yet another embodiment, the oxide catalyst precursor further comprises one or more ligating agents L. The term "ligand" may be used interchangeably with "ligating agent," "chelating agent" or "complexing agent" (or chelator, or chelant), referring to an additive that combines with metal ions, e.g., Group VIB and/or Promoter metals, forming a larger complex, e.g., a catalyst precursor.

In another embodiment, the catalyst is prepared from a catalyst precursor in the form of a hydroxide comprising of at least one Group VIII non-noble material and at least two Group VIB metals. In one embodiment, the hydroxide compound is of the general formula $A_v[(M^P)(OH)_x(L)^n_y]_z (M^{VIB}O_4)$, wherein A is one or more monovalent cationic species, M refers to at least a metal in their elemental or compound form, and L refers to one or more ligating agents.

In yet another embodiment, the catalyst is prepared from a catalyst precursor with the inclusion of at least a diluent, the precursor is of the formula $A_r [(M^{IIA})_s(M^{VIII})_t(Al)_u(OH)_v (L)_w]_x (Si_{(1-y)}Al_yO_2)_z (M^{VIB}O_4)$, wherein A is one or more monovalent cationic species, $M^{IIA}$ is one or more group IIA metals, $M^{VIII}$ is one or more Group VIII metals, Al is aluminum, L is one or more ligating agents, $(Si_{(1-y)}Al_yO_2)$ is a silica-alumina moiety, $M^{VIB}$ is one or more Group VIB metals with the atomic ratio of $M^{VII}$:$M^{VIB}$ between 100:1 and 1:100.

In one embodiment, A is at least one of an alkali metal cation, an ammonium, an organic ammonium and a phosphonium cation. In one embodiment, A is selected from monovalent cations such as NH4+, other quaternary ammonium ions, organic phosphonium cations, alkali metal cations, and combinations thereof.

In one embodiment, L is one or more ligating agents. In another embodiment, L is charge neutral or has a negative charge n<=0. In another embodiment, L is a non-toxic organic oxygen containing ligating agent with an LD50 rate (as single oral dose to rats) of greater than 500 mg/Kg. The term "charge-neutral" refers to the fact that the catalyst precursor carries no net positive or negative charge. In one embodiment, ligating agents include both polydentate as well as monodentate, e.g., $NH_3$ as well as alkyl and aryl amines. Other examples of ligating agents L include but are not limited to carboxylates, carboxylic acids, aldehydes, ketones, the enolate forms of aldehydes, the enolate forms of ketones, and hemiacetals, and combinations thereof. The term "carboxylate" refers to any compound containing a carboxylate or carboxylic acid group in the deprotonated or protonated state. In another embodiment, L is selected from the group of organic acid addition salts such as formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids such as methane sulfonic acid and ethane sulfonic acid, aryl sulfonic acids such as benzene sulfonic acid and p-toluene sulfonic acid and arylcarboxylic acids; carboxylate containing compounds such as maleate, formate, acetate, propionate, butyrate, pentanoate, hexanoate, dicarboxylate, and combinations thereof.

$M^P$ is at least a promoter metal. In one embodiment, $M^P$ has an oxidation state of either +2 or +4 depending on the Promoter metal(s) being employed. $M^P$ is selected from Group VIII, Group IIB, Group IIA, Group IVA and combinations thereof. In one embodiment, $M^P$ is at least a Group VIII metal, $M^P$ has an oxidation state P of +2. In another embodiment, $M^P$ is selected from Group IIB, Group IVA and combinations thereof. In one embodiment, the Promoter metal $M^P$ is at least a Group VIII metal, $M^P$ having an oxidation state of +2 and the catalyst precursor is of the formula $A_v[(M^P)(OH)_x(L)^n{}_y]_z(M^{VIB}O_4)$ to have (v−2+2z−x*z+n*y*z)=0. In one embodiment, the Promoter metal $M^P$ is a mixture of two Group VIII metals such as Ni and Co. In yet another embodiment, $M^P$ is a combination of three metals such as Ni, Co and Fe. In one embodiment where $M^P$ is a mixture of two group IIB metals such as Zn and Cd, the charge-neutral catalyst precursor is of the formula $A_v[(Zn_aCd_a{}')(OH)_x(L)_{n\ y}]_z(M^{VIB}O^4)$.

In yet another embodiment, $M^P$ is a combination of three metals such as Zn, Cd and Hg, and the catalyst precursor is of the formula $A_v[(Zn_aCd_a{}'Hg_a{}'')(OH)_x(L)_{n\ y}]_z(M^{VIB}O^4)$.

In one embodiment, the Promoter metal $M^P$ is selected from the group of IIB and VIA metals such as zinc, cadmium, mercury, germanium, tin or lead, and combinations thereof, in their elemental, compound, or ionic form. In yet another embodiment, the Promoter metal $M^P$ further comprises at least one of Ni, Co, Fe and combinations thereof, in their elemental, compound, or ionic form. In another embodiment, the Promoter metal is a Group IIA metal compound, selected from the group of magnesium, calcium, strontium and barium compounds which are at least partly in the solid state, e.g., a water-insoluble compound such as a carbonate, hydroxide, fumarate, phosphate, phosphite, sulphide, molybdate, tungstate, oxide, or mixtures thereof.

In one embodiment, $M^{VIB}$ is at least a Group VIB metal having an oxidation state of +6. In one embodiment, $M^{P:MVIB}$ has an atomic ratio between 100:1 and 1:100. v−2+P*z−x*z+n*y*z=0; and $0 \leq y \leq -P/n$; $0 \leq x \leq P$; $0 \leq v \leq 2$; $0 \leq z$. In one embodiment, $M^{VIB}$ is molybdenum. In yet another embodiment, $M^{VIB}$ is a mixture of at least two Group VIB metals, e.g., molybdenum and tungsten.

Methods for Making Catalyst: The catalyst prepared herein has a low volume shrinkage in hydroprocessing operations, in combination with high mechanical strength and improved performance, i.e., providing high yield conversions. The low shrinkage results from the controlled/optimization of the thermal treatment of the catalyst precursor.

Reference will be made to FIG. 1, which is a block diagram schematically illustrating an embodiment of a general process for making a multi-metallic catalyst having an optimum pore volume and surface area.

Forming a Precipitate or Cogel: The first step 10 in the process is a precipitation or cogellation step, which involves reacting in a mixture of the metal precursors 11, e.g., Promoter metal component(s) and the Group VIB metal component to obtain a precipitate or cogel. The term "cogel" refers to a co-precipitate (or precipitate) of at least two metal compounds. The metal precursors can be added to the reaction mixture as a solid, in solution, suspension, or a combination thereof. If soluble salts are added as such, they will dissolve in the reaction mixture and subsequently be precipitated or cogelled, or forming a suspension. The solution can be heated optionally under vacuum to effect precipitation and evaporation of the liquid.

The precipitation (or cogelation) is carried out at a temperature and pH under which the Promoter metal compound and the Group VIB metal compound precipitate or form a cogel. In one embodiment, the temperature at which the cogel is formed is between 25-350° C. In one embodiment, the catalyst precursor is formed at a pressure between 0 to 3000 psig. In a second embodiment, between 10 to 1000 psig. In a third embodiment, between 30 to 100 psig. The pH of the mixture can be changed to increase or decrease the rate of precipitation or cogelation depending on the desired characteristics of the product. In one embodiment, the mixture is left at its natural pH during the reaction step(s). In another embodiment the pH is maintained in the range of 0-12. In another embodiment, the pH is maintained in the range of 7-10. Changing the pH can be done by adding base or acid 12 to the reaction mixture, or adding compounds, which decompose upon temperature increase into hydroxide ions or H$^+$ ions that respectively increase or decrease the pH. In another embodiment, adding compounds which participate in the hydrolysis reaction. Examples of compounds to be added for pH adjustment include but are not limited to urea, nitrites, ammonium hydroxide, mineral acids, organic acids, mineral bases, and organic bases.

In one embodiment, at least a ligating agent L can be optionally added prior to or after precipitation or cogelation of the promoter metal compounds and/or Group VIB metal compounds, i.e., the ligating agent L can be added to the metal precursors as one of the reactors forming the precipitate, or it can be added after the precipitate is formed. It is observed that the incorporation of ligating agents in some embodiments significantly increase the porosity of the catalyst precursor. In one embodiment, a chelated catalyst precursor shows a macropore volume of at least 10% greater than an un-chelated catalyst precursor. In a second embodiment, the macropore volume increase is at least 20%.

In one embodiment, instead of or in addition to the ligating agent L, diluent amounts from 5-95 wt. % of the total composition of the catalyst precursor can also be added to this step, depending on the envisaged catalytic application. These materials can be applied before or after the precipitation or cogelation of the metal precursors. Examples of diluent materials include zinc oxide; zinc sulfide; niobia; tetraethyl orthosilicate; silicic acid; titania; silicon components such as sodium silicate, potassium silicate, silica gels, silica sols, silica gels, hydronium- or ammonium-stabilized silica sols, and combinations thereof, aluminum components useful in the process of the present invention include, but are not limited to, sodium aluminate, potassium aluminate, aluminum sulfate, aluminum nitrate, and combinations thereof, magnesium components such as magnesium aluminosilicate clay, magnesium metal, magnesium hydroxide, magnesium halides, magnesium sulfate, and magnesium nitrate; zirconia; cationic clays or anionic clays such as saponite, bentonite, kaoline, sepiolite or hydrotalcite, or mixtures thereof. In one embodiment, titania is used as a diluent in an amount of greater than 50 wt. %, on a final catalyst precursor basis (as an oxide or hydroxide).

Liquid Removal: In the next step 20, at least 50 wt. % of liquid (supernatant/water) is removed from the precipitate (or suspension) via separation processes known in the art, e.g., filtering, decanting, centrifuging, etc. In one embodiment, liquid in the precipitate is removed via filtration with vacuum techniques or equipment known in the art, giving a wet filter cake. A wet filter cake is generally defined as filter cake having approximately 10 to 50 wt. % liquid, thus being generally free of water or other solvent such as methanol and the like.

In one embodiment, optional drying of the filter cake is performed under atmospheric conditions or under an inert atmosphere such as nitrogen, argon, or vacuum, and at a temperature sufficient to remove water but not removal of organic compounds. In one embodiment, drying is performed at about 50 to 120° C. until a constant weight of the catalyst precursor is reached. In another embodiment, the drying is done at a temperature between 50° C. to 200° C. for a period ranging from /2 hour to 6 hours. Drying can be done via thermal drying techniques known in the art, e.g., flash drying, belt drying, oven drying, etc.

Post Precipitate Ligating: In the optional chelating step 26, the catalyst precursor precipitate is treated with at least a ligating agent L. In one embodiment, chelating is carried out by passing organic ligating agents/solvent vapor through the filter cake. In another embodiment, which is a more effective way of incorporating ligating agents, the filter cake is washed in a solution containing the ligating agent. The ligating agent used herein can be the same or different from any ligating agent that may have been used/incorporated into the metal precursors (reagents) in the precipitating step.

In one embodiment, a catalyst precursor incorporating a ligating agent applied post precipitate forming shows a total pore volume of at least 25% greater than a catalyst precursor that is chelated in the process of forming the precipitate, e.g., with the ligating agent(s) being added to one of the metal precursors or to the mixture of metal precursors, prior to or during the formation of the precipitate. In a second embodiment, the total pore volume increase is at least 40%. In a third embodiment, the total pore volume increase is at least 50%.

It is believed that in the post precipitate chelating step (after the formation of the precursor precipitate), the ligating agent provides the precursor precipitate with additional high specific surface area for the subsequent sulfiding step. It is also believed that in some embodiments, the ligating agent changes the surface charge of the precursor, which subsequently helps in keeping the particles separate (less clumped together) in the drying step, for a catalyst with higher porosity.

Non-Agglomerative Drying: "Non-agglomerative drying" means a drying process in which particle agglomeration is substantially prevented. For example, examination of the catalyst particle size in a wet centrifuge cake indicates that the median particle size may be in the range of 1 to 3 μm. However, after drying such a cake in the conventional manner, oven drying or tray drying, the resulting median size of the particle is much larger as the particles remain stuck together/clump up of more than 40 times the initial size. In some embodiments of tray drying, the filter cake dries out forming clumps or chunks (green body), requiring subsequent milling to reduce the particle size of the precursor.

In non-agglomerative drying process, significant agglomeration is prevented with less clumping or with clumping of smaller sizes. In one embodiment, the non-agglomerative drying produces particles having a median size of less than 20 times the median size of the pre-drying particles. In another embodiment, the median size is less than 10 times the median size of the pre-drying particles. In a third embodiment, the non-agglomerative drying produces particles having a median size of less than 5 times the median size of the particles pre-drying.

Examples of non-agglomerative drying methods include but are not limited to flash drying, freeze drying, and fluidized bed drying, for the moisture content to be reduced to less than 15%. In one embodiment, the moisture content is reduced to less than 10%. In a third embodiment, to less than 5%. In a fourth embodiment, to less than 2%. In one embodiment, after non-agglomerative drying, the dried catalyst precursor has a median particle size of less than 40 μm.

In one embodiment, after a substantial amount of liquid is removed from the precipitate generating a wet filter cake, the wet filter cake undergoes non-agglomerative drying 26 in a flash drying process. In another embodiment (as shown by dotted lines), the wet filter cake is first chelated before the non-agglomerative drying step. In one embodiment, the filter cake is flash-dried at an air (or nitrogen) temperature of 70° C. to 250° C. in a period of less than 60 seconds. In another embodiment, the wet filter cake undergoes fluidized bed drying, wherein the particles surface area is exposed to the high volume air stream with the heat being transferred to the product surface by convection in a short period of time, cutting down on particle agglomeration. Fluidized bed drying takes longer than flash drying, but still allows the precursor particles to dry in a matter of minutes instead of hours as in tray drying or oven drying and with substantially less clumping.

In comparative tests between tray dried samples (150° F. between 2 to 4 hrs.) and flash dried samples, it is found that the flash dried precursors have a total pore volume (via mercury prosimeter) of at least 2 times the tray dried precursors. In another embodiment, the flash dried precursors have a total pore volume of at least 3 times the tray dried precursors.

Forming Catalyst Precursor Mix For Shaping: In this step 30, the dried filter cake is mixed together with water and other optional materials including but not limited to shaping aids 32, peptizing agents, pore forming agents, and diluent materials 13. In one embodiment, rework material in the form of filter cake material, extrudable dough and/or dry particles/pieces of precursor materials from previous runs can be optionally included the materials to form a new batch of catalyst precursor mix.

The precursor batch mixture is mixed for a sufficient period of time to obtain a mixture that is substantially uniform or homogeneous. The mixing time depends on the type and efficiency of the mixing technique, e.g., milling, kneading, slurry mixing, dry or wet mixing, or combinations thereof and the mixing apparatus used, e.g., a pug mill, a blender, a double-arm kneading mixer, a rotor stator mixer, or a mix muller. In one embodiment, the mixing time ranges from 0.1 to 10 hours.

In one embodiment, a shaping aid agent is added in a ratio of between 100:1 and 10:1 (wt. % catalyst precursor to wt. % shaping aid). In one embodiment, the shaping aid agent is selected an organic binder of the cellulose ether type and/or derivatives. Examples include methylcellulose, hydroxybutylcellulose, hydrobutyl methylcellulose, hydroxyethylcellulose, hydroxymethylcellulose, hydroxypropylcellulose, hydroxypropyl methylcellulose, hydroxyethyl methylcellulose, sodium carboxy methylcellulose, and mixtures thereof. In another embodiment, the shaping aid is a polyakylene glycol such as polyethylene glycol (PEG). In yet another embodiment, shaping aids are selected from saturated or unsaturated fatty acid (such as politic acid, satiric acid or oleic acid) or a salt thereof, a polysaccharide derived acid or a salt thereof, graphite, starch, alkali stearate, ammonium stearate, stearic acid, mineral oils, and combinations thereof.

In one embodiment, a peptizing agent may be added to the mixture. The peptizing agent may be an alkali or an acid, e.g., ammonia, formic acid, citric acid, nitric acid, carboxylic acid, etc. In one embodiment whether the catalyst precursor material is to be spray-dried, ammonia solution from 10 to 28% strength can be added in amounts of from 50 to 150 ml per 100 g of spray-dried material. In another embodiment, acids can be employed in the form of aqueous solutions of from 2 to 4% strength, in amounts of from 10 to 20 ml per 100 g of spray-dried material.

In another embodiment, a pore forming agent is also added to the mixture along with the rework. Examples of pore forming agents include but are not limited to mineral oils, steric acid, polyethylene glycol polymers, carbohydrate polymers, methacrylates, cellulose polymers, and carboxylates which decompose upon being heated. Examples of commercially available cellulose based pore forming agents include but are not limited to: Methocel™ (available from Dow Chemical Company), Avicel™ (available from FMC Biopolymer), Morwet™ (from Witco) and Porocel™ (available from Porocel).

In yet another embodiment, diluent materials can be added. The diluent materials added in this step can be the same as or different from any diluent materials that may have been added to the step of forming the precipitate from metal precursors above.

In one embodiment wherein the catalyst precursor is to be shaped via pelletizing, extrusion, or pressing, a sufficient amount of water is added to the mixing batch to adjust the batch viscosity to a convenient level for plasticizing and shaping, i.e., a mixture of dough consistency. In one embodiment, a sufficient amount of water is added for the mixture to have between 50 to 90% solids (LOI). In another embodiment, between 60 to 70% solids (LOI).

Shaping Process: In this step, the catalyst precursor mix is shaped into formed particles, such as spheroids, pills, tablets, cylinders, irregular extrusions, merely loosely bound aggregates or clusters, etc., using any of the methods known in the art including pelletizing, extrusion, tableting, molding, tumbling, pressing, spraying and spray drying.

In one embodiment, a shaped catalyst precursor is formed via extrusion, using extrusion equipment known in the art, e.g., single screw extruder, ram extruder, twin-screw extruder, etc. In another embodiment, the shaping is done via spray drying at an outlet temperature ranging from 100° C. to 320° C. In one embodiment, shaped catalyst precursor is extruded into extrudate having a diameter from about 1/16 to 1/6 of an inch. After extrusion the extrudate can be cut to suitable lengths, e.g., 1/16-inch to 5/16-inch, to produce cylindrical pellets.

Thermal Treatment: In one embodiment, the shaped catalyst precursor is air (or nitrogen) dried in a directly or indirectly heated oven, tray drier, or belt drier at about 50° C. to 325° C. for about 15 minutes to 24 hours, and wherein the temperature is room temperature to drying temperature at a rate of 1-50° C. per minute. In one embodiment, the temperature is ramped up at a slow rate of 1-2° C. per minute. In a second embodiment, air drying is performed at a fast ramp up rate of at least 25° C. per minute.

In one embodiment, after the thermal treatment, the shaped catalyst can be optionally calcined at a temperature in the range of about 350° C. to 750° C. in a suitable atmosphere, e.g., inerts such as nitrogen or argon, or steam. In yet another embodiment, the calcination is carried out at a temperature between 350° C. to 600° C. In the calcination process, the catalyst precursor gets converted into an oxide.

Sulfiding Step: The shaped catalyst precursor containing rework material 61 can be sulfided to form an active catalyst, with the use of at least a sulfiding agent 62 selected from the group of: elemental sulfur by itself, a sulfur-containing compound which under prevailing conditions, is decomposable into hydrogen sulphide; $H_2S$ by itself or $H_2S$ in any inert or reducing environment, e.g., $H_2$. Examples of sulfiding agents include ammonium sulfide, ammonium polysulfide ($[(NH_4)_2S_x]$, ammonium thiosulfate (($NH_4)_2S_2O_3$), sodium thiosulfate $Na_2S_2O_3$), thiourea $CSN_2H_4$, carbon disulfide, dimethyl disulfide (DMDS), dimethyl sulfide (DMS), dibutyl polysulfide (DBPS), mercaptanes, tertiarybutyl polysulfide (PSTB), tertiarynonyl polysulfide (PSTN), and the like. In one embodiment, hydrocarbon feedstock is used as a sulfur source for performing the sulfidation of the catalyst precursor.

In the sulfiding step, shaped catalyst precursor is converted into an active catalyst upon contact with the sulfiding agent at a temperature ranging from 70° C. to 500° C., from 10 minutes to 15 days, and under a H2-containing gas pressure. In one embodiment, The total pressure during the sulfidation step can range between atmospheric to about 10 bar (1 MPa). If the sulfidation temperature is below the boiling point of the sulfiding agent, the process is generally carried out at atmospheric pressure. Above the boiling temperature of the sulfiding agent/optional components (if any), the reaction is generally carried out at an increased pressure.

Use of the Catalyst: As catalyst precursors sometimes can be sulfided in-situ, e.g., in the same hydrotreating reactors during hydrotreatment, catalyst performance can be characterized by the properties of the catalyst precursors before sulfidation.

In one embodiment, the catalyst precursor is characterized as having essentially a monomodal pore size distribution with a substantial portion of the pores being macropores. As used herein, essentially monomodal pore size distribution means that more than 90% of the pores being macropores, and less than 10% as mesopores. In one embodiment, the catalyst precursor has a pore distribution such that more than 95% of the pore volume is presented as macropores. In another embodiment, more than 97% of the pore volume is present as macropores. In yet another embodiment, more than 99% of the pores are macropores. Mesopores if present have a pore volume ranging from 0.005 to 0.01 cc/g. In one embodiment, the catalyst precursor is characterized as having a total pore volume ranging from 0.08 to 2.0 cc/g. In another embodiment, the total pore volume ranges from 0.10 to 1. cc/g. In a third embodiment, the total pore volume is at least 0.12 cc/g. In a fourth embodiment for a catalyst precursor that is post precipitate ligated, the total pore volume is at least 0.15 cc/g.

As the catalyst precursor, and the sulfided bulk metallic catalyst formed therefrom, have sufficient macropore sites and large pore volume to overcome the diffusion limitations of heavy petroleum feeds, the bulk metallic catalyst in one embodiment is particularly suitable for hydrotreating heavy petroleum feeds having an atmospheric residue (AR) boiling point in the range of 343° C. (650° F.)- to 454° C. (850° F.) and particularly above 371° C. (700° F.), under wide-ranging reaction conditions such as temperatures of from 200 to 450° C., hydrogen pressures of from 15 to 300 bar, liquid hourly space velocities of from 0.05 to 10 $h^{-1}$ and hydrogen treat gas rates of from 35.6 to 2670 $m^3/m^3$ (200 to 15000 SCF/B- or "Standard Cubic Feet per Barrel" of hydrocarbon compound feed to the reactor).

Heavy oil feeds having a boiling point greater than 343° C. (650° F.) are commonly characterized as having relatively high specific gravity, low hydrogen-to-carbon ratios, and high carbon residue. They contain large amounts of asphaltenes, sulfur, nitrogen and metals, which increase hydrotreating difficulty with their large molecular diameter. In one embodiment with the monomodal distribution of primarily masopores, the bulk catalyst is particularly suited for hydrotreating heavy petroleum feeds having an average molecular diameter ranging from 0.9 nm to 1.7 nm (9 to 17 angstrom), providing an HDN conversion level of >99.99% (700° F.+ conversion), lowering the sulfur level in fraction above 700° F. boiling point to less than 20 ppm in one embodiment, and less than 10 ppm in a second embodiment. In one embodiment, the bulk catalyst is particularly suited for hydrotreating a heavy petroleum feed having an average molecular diameter ranging from 0.9 nm to 1.7 nm. In yet another embodiment, the bulk catalyst is particularly suitable for treating a heavy oil feed having an average molecular weight Mn ranging from 300 to 400 g/mole.

Besides having a unique pore size distribution of essentially being modomodal with macropores, the precursor for forming the catalyst also exhibits other desirable properties, including a compact bulk density (CBD) of at most 1.6 g/cc; a crush strength of at least about 4 lbs; and an attrition loss of less than 7 wt. %. In one embodiment, the attrition loss is less than 5 wt. %. In a second embodiment, the CBD is at most 1.4 g/cc. In a third embodiment, the CBD is at most 1.2 g/cc. In a fourth embodiment, the CBD is in the range of 1.2 g/cc to 1.4 g/cc.

In one embodiment, the catalyst precursor has a particle density of equal or less 2.5 g/cc. In another embodiment, the particle density is equal or less than 2.2 g/cc.

In one embodiment, the catalyst precursor is characterized has having a surface area measured by the BET method, using nitrogen as adsorbate, ranging from 40 to 400 $m^2/g$. In a second embodiment, a surface area ranging from 60 to 300 $m^2/g$. In a third embodiment, a surface area ranging from 100 to 250 $m^2/g$. In one embodiment, the catalyst precursor has a combined high surface area and high volume pore with a surface area of at least 150 $m^2/g$.

EXAMPLES

The following illustrative examples are intended to be non-limiting.

Example 1

Ni—Mo—W-Maleate Catalyst Precursor

A catalyst precursor of the formula $(NH_4)\{[Ni_{2.6}(OH)_{2.08}(C_4H_2O_4^{2-})_{0.06}](Mo_{0.35}W_{0.65}O_4)_2\}$ was prepared as follows: 52.96 g of ammonium heptamolybdate $(NH_4)_6Mo_7O_{24}\cdot 4H_2O$ was dissolved in 2.4 L of deionized water at room temperature. The pH of the resulting solution was within the range of 2-3. 52.96 g of ammonium heptamolybdate $(NH_4)_6Mo_7O_{24}\cdot 4H_2O$ was dissolved in the above solution. The pH of the resulting solution was within the range of 5-6. 73.98 g of ammonium metatungstate powder was then added to the above solution and stirred at room temperature until completely dissolved. 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2\cdot 6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration. The precipitate was dispersed into a solution of 10.54 g of maleic acid dissolved in 1.8 L of DI water and heated to 70° C. The resulting slurry was stirred for 30 min. at 70° C. and filtered.

Example 2

Ni—Mo—W Catalyst Precursor

A catalyst precursor of the formula $(NH_4)\{[Ni_{2.6}(OH)_{2.08}](Mo_{0.35}W_{0.65}O_4)_2\}$ was prepared as follows: 52.96 g of ammonium heptamolybdate $(NH_4)_6Mo_7O_{24}\cdot 4H_2O$ was dissolved in 2.4 L of deionized water at room temperature. The pH of the resulting solution was within the range of 5-6. 73.98 g of ammonium metatungstate powder was then added to the above solution and stirred at room temperature until completely dissolved. 90 ml of concentrated $(NH_4)OH$ was added to the solution with constant stirring. The resulting molybdate/tungstate solution was stirred for 10 minutes and the pH monitored. The solution had a pH in the range of 9-10. A second solution was prepared containing 174.65 g of $Ni(NO_3)_2\cdot 6H_2O$ dissolved in 150 ml of deionized water and heated to 90° C. The hot nickel solution was then slowly added over 1 hr to the molybdate/tungstate solution. The resulting mixture was heated to 91° C. and stirring continued for 30 minutes. The pH of the solution was in the range of 5-6. A blue-green precipitate formed and the precipitate was collected by filtration, giving a filtercake.

Example 3

Ni—Mo—W Maleate Catalyst Precursor—Post Precipitate Chelating

The precipitate of Example 2 was dispersed into a solution of 10.54 g of maleic acid dissolved in 1.8 L of DI water and heated to 70° C. The resulting slurry was stirred for 30 min. at 70° C. then filtered.

Example 4

Agglomerative vs. Non-Agglomertive Drying of Filter Cake

The catalyst precursor of Examples 1-3 in the form of filter cake (having about 50% moisture, particle size averaging 1.66 µm D50 and maximum of 7.5 µm) was flash dried in a 2" ThermaJet dryer with a 600° F. inlet temperature and 220-325° F. outlet temperature, less than 1 residence time of less than 1 minute, giving a powder having about 8 to 10% moisture. The Ni—Mo—W precursor of Example 2 was also tray-dried at about 150° F. for 2 to 4 hours. Table 1 contains results comparing tray-drying vs. flash-drying for the Ni—Mo—W precursor of Example 2:

TABLE 1

| Ni—Mo—W Sample | Surface area $m^2/g$ | $N_2$ pore volume cc/g | Hg (total) pore volume cc/g | Microporosity* Pore volume cc/g | Macroporosity pore volume cc/g |
|---|---|---|---|---|---|
| flash-dried | 152 | 0.106 | 0.314 | 0.003 | 0.266 |
| tray-dried | 70 | 0.075 | 0.108 | 0.005 | 0.027 |

*nil - amount measured within instrumental error

Example 5

Forming Shaped Catalyst Precursors

In this example, 40 g of dried catalyst precursor prepared as per examples 1-3 was mixed with 0.8 g of methocel, (a commercially available methylcellulose and hydroxypropyl methylcellulose polymer from Dow Chemical Company), and approximately 7 g of DI water was added. Another 7 g of water was slowly added until the mixture was of an extrudable consistency. The mixture was extruded using any of a double barrel Wolf extruder with a 27½" screw and full-length of 33½" and with 1/16" die. The extrudate was cut into pellets with length of about ⅛" to ½".

After extrusion, the catalyst precursor pellets (Ni—Mo—W and Ni—Mo—W-maleate) were dried under $N_2$ at 120° C., and measured for pore volume and surface area. The results are presented in Table 2 as follows:

TABLE 2

| Samples | Surface area BET $m^2/g$ | $N_2$ meso pore volume cc/g | Hg macro pore volume cc/g | Hg meso pore volume cc/g |
|---|---|---|---|---|
| Ni—Mo—W maleate | 60 | 0.03 | 0.12 | 0.03 |
| Ni—Mo—W | 80 | 0.01 | 0.10 | 0.01 |
| Ni—Mo—W maleate post-precipitate ligating | 96 | 0.03 | 0.18 | 0.03 |

Example 6

Sulfidation with DMDS Gas Phase

The samples of shaped catalyst precursors from Example 5 were placed in a tubular reactor. The temperature was raised to 450° F. at a rate of 100° F./hr under $N_{2(g)}$ at 8 ft³/hr. The reaction was continued for 1 hour after which time the $N_2$ was switched off and replaced with $H_2$ at 8 ft³/hr and 100 psig for 1 hour. The $H_2$ pressure was then increased to 300 psig and maintained for less than 1 hr. after which time dimethyl disulfide (DMDS) was added at a rate of 4 cc/hour and then reaction allowed to proceed for 4 hr. The catalyst precursor was then heated to 600° F. and the rate of DMDS addition increased to 8 cc/hr. The temperature was maintained at 600° F. for 2 hours after which time sulfidation was complete.

Example 7

Hydroprocessing Process

The samples from Example 6 were tested under severe hydroprocessing conditions and activities with respect to hydrocracking, HDS, and HDN activity were evaluated, along with the volumetric shrinkage rate. The heavy oil feedstock was a heavy oil feed with a boiling point above 700° F., a sulfur content of 31135 ppm, a nitrogen content of 31230 ppm, and other properties as presented in Table 3. The reactor conditions include a pressure of 2300 psi, an $H_2$ gas rate of 5000 SCFB, and an LHSV of 0.75.

TABLE 3

| Properties | Heavy Oil feed |
|---|---|
| API Gravity | 20.0 |
| N, ppm | 1100 |
| S, wt % | 2.72 |
| Carbon, wt % | 85.6 |

TABLE 3-continued

| | Heavy Oil feed |
|---|---|
| 22 compounds | |
| Aromatics, vol % | 35.0 |
| Naphthenes, vol % | 27.8 |
| Paraffins, vol % | 13.5 |
| Sulfur compounds, vol % | 23.7 |
| Simdist, wt % | |
| 0.5/5 | 640/689 |
| 10/30 | 717/800 |
| 50/ | 866 |
| 70/90 | 930/1013 |
| 95/99 | 163/1168 |

Results obtained from the run included a 700° F.+conversion of at last 40%, sulfur reduction to less than 10 ppm in the stripper bottoms, $N_2$ level to less than 25 ppm in the stripper bottoms.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A catalyst precursor, upon sulfidation, forms a bulk multi-metallic catalyst for hydrotreating a hydrocarbon feed under hydroprocessing conditions, the catalyst precursor comprising at least a Group VIB metal compound; at least a promoter metal compound selected from Group VIII, Group IIB, Group IIA, Group IVA and combinations thereof; optionally at least a ligating agent; optionally at least a diluent;

wherein the catalyst precursor has an essentially monomodal pore size distribution with at least 90% of the pores being macropores and a total pore volume of at least 0.08 g/cc;

wherein the catalyst precursor is a hydroxide; and wherein the catalyst precursor is made in a process wherein the steps before sulfidation to form the bulk multi-metallic catalyst are carried out at a temperature of 200° C.

or less and wherein the catalyst precursor remains a hydroxide before sulfidation to form the bulk multi-metallic precursor.

2. The catalyst precursor of claim 1, wherein the catalyst precursor has a total pore volume of at least 0.10 g/cc.

3. The catalyst precursor of claim 1, wherein the catalyst precursor has a total pore volume of at least 0.12 g/cc.

4. The catalyst precursor of claim 1, wherein the catalyst precursor has an essentially monomodal pore size distribution with at least 95% of the pores being macropores.

5. The catalyst precursor of claim 1, wherein at least 97% of the pores are present as macropores.

6. The catalyst precursor of claim 1, wherein the catalyst precursor has a compact bulk density of at most 1.6 g/cc.

7. The catalyst precursor of claim 6, wherein the catalyst precursor has a compact bulk density of at most 1.4 g/cc.

8. The catalyst precursor of claim 6, wherein the catalyst precursor has a compact bulk density in the range of 1.2 to 1.6 g/cc.

9. The catalyst precursor of claim 1, wherein the catalyst precursor has a BET surface area in the range of 40 to 400 m²/g.

10. The catalyst precursor of claim 9, wherein the catalyst precursor has a BET surface area in the range of 100 to 250 m²/g.

11. The catalyst precursor of claim 1, wherein the catalyst precursor is of the formula $_v[(M^P)(OH)_x(L)^n{}_y]_z(M^{VIB}O_4)$, wherein A is at least one of an alkali metal cation, an ammonium, an organic ammonium and a phosphonium cation;

$M^P$ is the at least a promoter metal compound, P is oxidation state with $M^P$ having an oxidation state of +2 or +4; and $M^P$ is selected elected from Group VIII, Group IIB, Group IIA, Group IVA and combinations thereof;

L is at the least a ligating agent, $M^{VIB}$ is the at least a Group VIB metal, having an oxidation state of +6;

$M^P$:$M^{VIB}$ has an atomic ratio of 100:1 to 1:100 $0 \leq y \leq -P/n$; $0 \leq x \leq P$; $0 \leq v \leq 2$; $0 < z$.

12. The catalyst precursor of claim 11, wherein $M^P$ is at least a Group VIII metal, $M^{VIB}$ is selected from molybdenum, tungsten, and combinations thereof, and L is at least one of carboxylates, enolates, and combinations thereof.

13. The catalyst precursor of claim 12, wherein $M^{VIB}$ is a mixture of at least two Group VIB metals.

14. The catalyst precursor of claim 11, wherein L is selected from carboxylates, carboxylic acids, aldehydes, ketones, aldehydes, hemiacetals, formic acid, acetic acid, propionic acid, maleic acid, malic acid, cluconic acid, fumaric acid, succinic acid, tartaric acid, citric acid, oxalic acid, glyoxylic acid, aspartic acid, alkane sulfonic acids, aryl sulfonic acids, maleate, formate, acetate, propionate, butyrate, pentanoate, hexanoate, dicarboxylate, and combinations thereof.

15. The catalyst precursor of claim 11, wherein L is maleate.

* * * * *